UNITED STATES PATENT OFFICE.

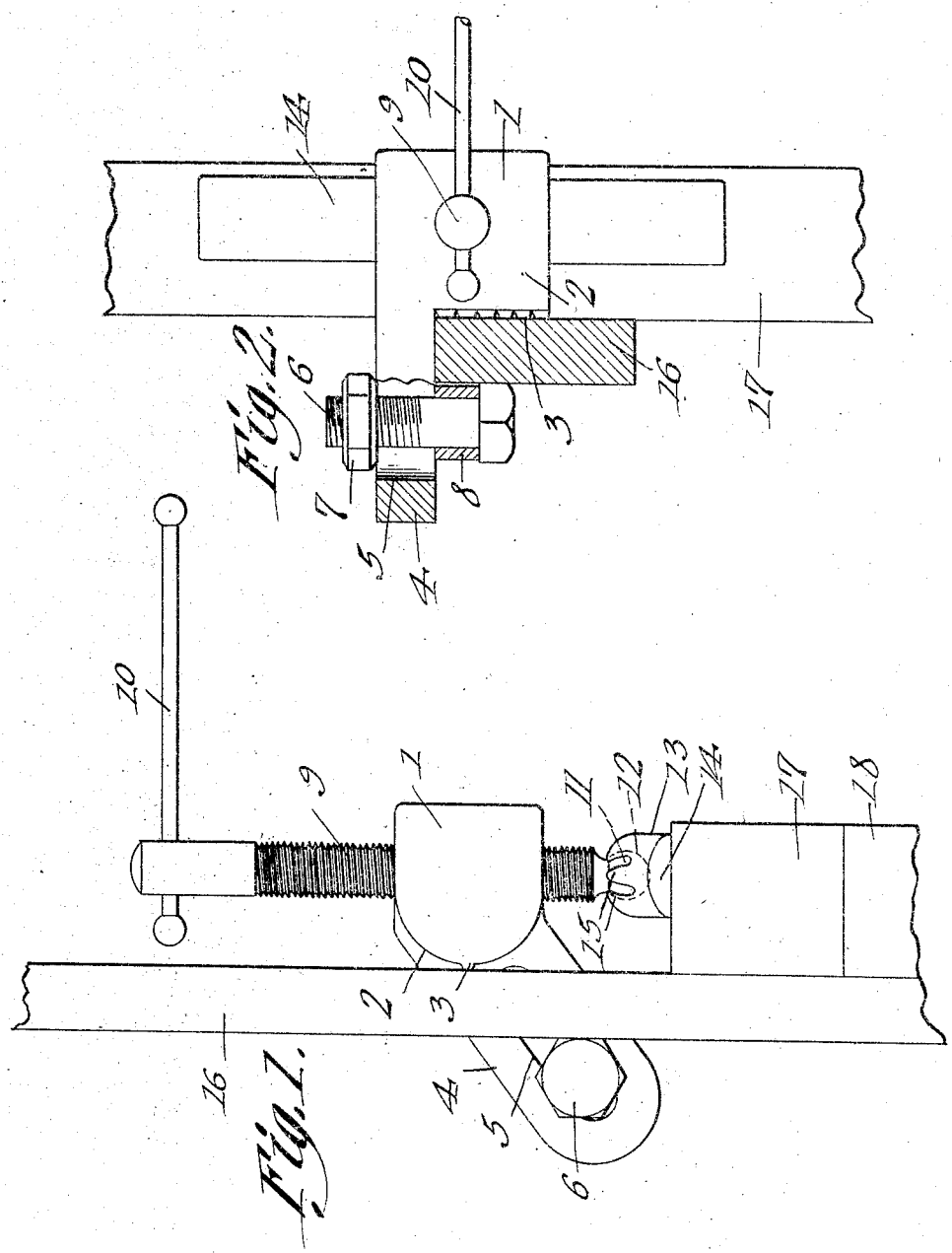

ARTHUR A. LIMPERT, OF GENEVA, NEW YORK.

CLAMP.

1,182,780.  Specification of Letters Patent.  Patented May 9, 1916.

Application filed January 28, 1916. Serial No. 74,803.

*To all whom it may concern:*

Be it known that I, ARTHUR A. LIMPERT, a citizen of the United States, residing at Geneva, in the county of Ontario and State of New York, have invented a new and useful Clamp, of which the following is a specification.

The present invention appertains to clamps, and aims to provide a novel and improved, yet simple and inexpensive device which can be used by carpenters, cabinet makers, carriage makers, ship builders, and other artisans, in the building up of a wooden or equivalent structure.

The clamp has novel means for engaging a rib, scantling, rafter, stud or other member at various points along its length, and means for clamping in place a board, plank or other member which rests against or crosses the first mentioned member at about right angles therewith.

The clamp is compact in construction, in order that it can be readily stored and transported, and can be quickly applied and removed, it also being adjustable in order that it can be applied to members of various widths or thicknesses with equal success.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is an elevation of the device as in use. Fig. 2 is a plan view thereof, portions being shown in section.

The clamp embodies a body or block 1 preferably in the form of a metallic casting or forging, and provided with a rounded or convexed side 2 provided with a longitudinal relatively sharp rib 3, which may be serrated or toothed if preferred. The body 1 is provided at one end with an obliquely projecting tongue 4 arranged at right angles with the body and provided with a longitudinal slot 5 through which a bolt 6 extends. A nut 7 is threaded upon the threaded end of the bolt and bears against the outer side of the tongue 4, and a spacing collar 8 is disposed upon the bolt 6 between the inner side of the tongue 4 and the head of the bolt to assist in holding the bolt in place when the nut 7 is tightened.

A screw 9 is threaded through the body 1, at an obtuse angle with the tongue 4, and that end thereof remote from the free end of the tongue 4 has a handle or tommy bar 10 slidable therethrough, whereby the screw can be conveniently and forcibly rotated, the handle or tommy bar being slidable to one side or the other, and affording considerable leverage or purchase. The other end of the screw 9 which is nearest the free end of the tongue 4 has a spherical head 11 received by the spherical socket 12 of a boss 13 with which an elongated shoe 14 is provided between its ends, the boss 13 having prongs 15 bent to embrace the head when the parts are assembled. The shoe 14 is thus connected by a ball and socket joint with the end of the screw 9, in order that the shoe may assume various positions with respect to the screw.

In use, the numeral 16 designating any part of a wooden or equivalent structure, to which is to be secured a member 17 at right angles therewith, the member 17 being intended to fit tightly against another permanent or temporary member 18, the clamp is applied to the member 16 with the body 1 at one side thereof, and the bolt 6 at the opposite side, as seen in the figures, and when the clamp is brought to proper position with the shoe 14 bearing against the member 17, the clamp is swung, counter-clockwise as seen in Fig. 1, so that the head of the bolt 6 and rib 3 bear against opposite sides of the member 16 with the tongue 4 crossing the member 16 at an obtuse angle therewith, it being understood that the bolt 6 can be readily adjusted before the clamp is applied to be properly spaced from the body 1. The rib 3 serves to bite the member 16, and when the screw 9 is rotated to move toward the member 17, it will tend to separate the body 1 and member 17, but the body 1 being forced away from the member 17 will cause the rib 3 to bite the member 16, which will provide a binding or gripping action of the clamp upon the member 16 so that it cannot slide or move thereon. Consequently, the member 17 is forced and clamped tightly against the member 18, the pressure depending upon the amount that the screw 9 is rotated. When the member 17 is clamped in place, it can be readily nailed or otherwise secured to the member 16. The same operation is employed for clamping a number of members in place, or the members can be clamped one at a time if preferred. The shoe 14 can rest flatly against the member 17, even though the screw 9 is not perpendicular with the member.

The present clamp will be found useful by carpenters, cabinet and carriage makers, ship builders and other mechanics or artisans, as will be apparent from the foregoing.

Having thus described the invention, what is claimed as new is:—

1. A clamp embodying a body having one side provided with a rib to bite a member, said body having an oblique tongue at one end to cross said member, a member carried by said tongue to bear against that side of the aforesaid member opposite the body, and a screw threaded through the body.

2. A clamp embodying a body having a curved side with a biting rib projecting from said side, the body having an oblique tongue at one end provided with a longitudinal slot, a bolt adjustable in said slot and adapted to bear against the opposite side of a member engaged by said rib, and a clamping screw threaded through the body at an obtuse angle with said tongue.

In testimony that I claim the foregoing as my own, I have hereto affixed my signature in the presence of two witnesses.

ARTHUR A. LIMPERT.

Witnesses:
JOHN T. EMMETT,
ARTHUR D. MERSELIS.